No. 610,588. Patented Sept. 13, 1898.
H. C. SCHRADER.
GLASS CUTTING-OFF OR SEVERING MACHINE.
(Application filed Feb. 12, 1898.)
(No Model.)
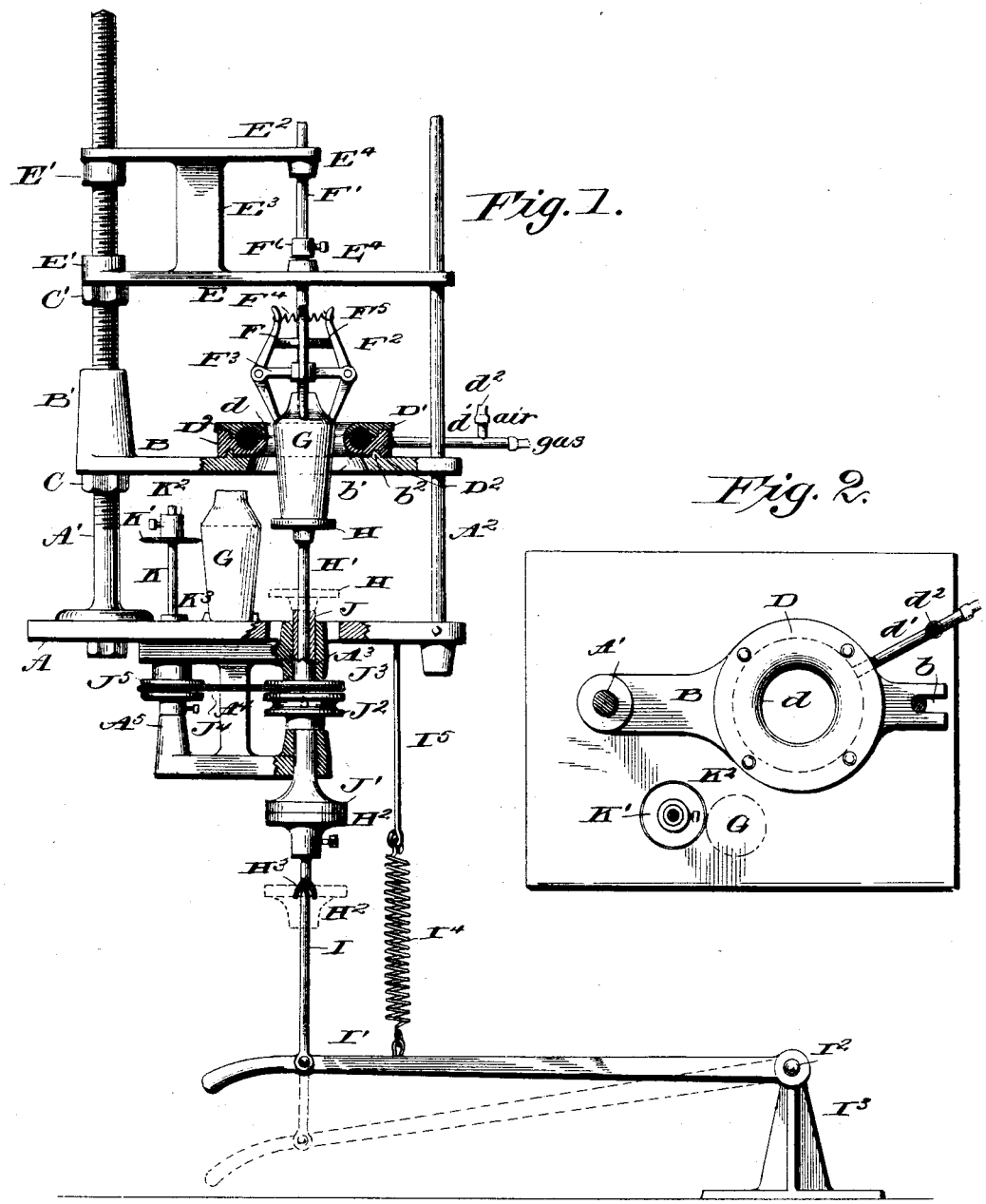
Witnesses
L. C. Hills.
Alfred T. Gage.
Inventor:
Henry C. Schrader,
by E. B. Stocking
Attorney.

UNITED STATES PATENT OFFICE.

HENRY C. SCHRADER, OF MOUNT PLEASANT, PENNSYLVANIA.

GLASS CUTTING-OFF OR SEVERING MACHINE.

SPECIFICATION forming part of Letters Patent No. 610,588, dated September 13, 1898.

Application filed February 12, 1898. Serial No. 670,117. (No model.)

*To all whom it may concern:*

Be it known that I, HENRY C. SCHRADER, a citizen of the United States, residing at Mount Pleasant, in the county of Westmoreland, State of Pennsylvania, have invented certain new and useful Improvements in Glass Cutting-Off or Severing Machines, of which the following is a specification, reference being had therein to the accompanying drawings.

This invention relates to a glass cutting or severing machine, and is particularly adapted for the operation of cutting off or removing surplus from a blown glass article.

The invention has for its object to apply to the article an even degree of heat throughout its entire circumference and to hold the article in such relation to the heating device that the distance between the burner and the glass to be severed will be substantially equal from all points, and consequently the degree of heat the same.

The invention has for a further object to remove the blown article from the burner by the reciprocation of the base upon which it is supported and also to permit the adjustment of the burner and of the holding-chuck and to effect the adjustment of the same in different relations to each other.

Other objects and advantages of the invention will hereinafter appear in the following description, and the novel features thereof will be particularly pointed out in the appended claims.

In the drawings, Figure 1 represents a side elevation of the invention with parts in section, and Fig. 2 is a cross-section above the burner with the chuck omitted.

Like letters of reference indicate like parts throughout both figures of the drawings.

The letter A designates a support which is provided with a threaded adjusting-standard $A'$ and with a guiding-standard $A^2$. Upon the adjusting-standard there is located a burner-support B, provided with a sleeve $B'$, which surrounds the threaded standard and which is supported in its adjusted position by means of a nut C, threaded upon the standard. The opposite end of the burner-support B is slotted, as at $b$, to embrace the guide $A^2$, and the support is also formed with a circular aperture $b'$, around which the annular burner D is located. This burner is held in a fixed relation with the aperture $b'$ by means of a flange or projection $b^2$, extending upward from the support and fitting within a suitable recess or groove formed in the burner. The burner D is composed of sectional members $D'$ and $D^2$, which may be secured together by any desired means, and the inner walls of which sections are slightly separated from each other, so as to leave a fine slit or burner-orifice extending around the inner periphery of the annular burner. By this means a thin sheet of flame is directed against the article around its entire periphery and a perfectly even degree of heat maintained upon all sides of the article to be severed. By forming the parts of the burner separable the same may be opened for cleaning when desired, or, if found desirable, a different construction of the upper section $D'$ may be applied, so as to increase or decrease the distance between the inner walls of the sectional members, and thus regulate the size of the burner-orifice. Fuel is applied to the burner by means of a suitable pipe $d'$, provided with an air connection $d^2$ to constitute a blast within the burner.

Above the burner-support I locate a support E for the chuck or clamp F. This support is provided with collar portions $E'$, which surround the threaded standard $A'$, and is held at its vertical adjustment by means of the nut $C'$, threaded upon the standard. The chuck-support E also embraces and is guided by the standard $A^2$ and is provided with a supplemental support $E^3$ in a plane above the support E, which plate $E^2$ is connected with the plate E by means of a web or rib $E^3$. The plates E and $E^2$ are each provided with suitable bearing-apertures $E^4$ for the reception of the spindle $F'$ of the chuck F. The chuck F is provided with a plurality of pivoted arms $F^2$, which are mounted upon spider-arms $F^3$, extending from the lower portion of the spindle $F'$. The lower ends of the arms $F^2$ are normally drawn outward by means of springs $F^4$, connecting their upper ends. The outward limit of the lower ends of the arms $F^2$ is controlled by means of a nut $F^5$, threaded upon the spindle $F'$ and engaging the inner face of the upper ends of the arms $F^2$. The spindle upon which the chuck is mounted is capable of upward movement within its bearings $E^4$; but the downward movement thereof is limited by means of a set collar $F^6$, applied to the spindle between the bearing-boxes. A plurality of these chuck-arms are provided, so that the upper portion of the article to be cut or severed will be centered in its relation to the annular burner surrounding the same. I have found that this centering action can be best effected by the use of four arms; but it is obvious that more or less may be applied, as found desirable.

The glass article G to be severed is supported upon a table or base H, provided with a downwardly-extending spindle H', which at its lower end has clamped thereon one member $H^2$ of a frictional clutch. The extreme lower end of the spindle H' is provided with a bearing-cap $H^3$, in which rests the pivot-arm I, carried by the lever I'. This foot-lever is suitably journaled at $I^2$ upon a standard $I^3$, located upon the floor or other foundation, and is normally held in an elevated position by means of a tension-spring $I^4$, connected to the base of the machine by means of a rod $I^5$. Surrounding the spindle H' is a sleeve or collar J, which at its lower end is provided with a friction-clutch member J', adapted to be engaged by the clutch member $H^2$. This sleeve is provided with a power-receiving pulley $J^2$ and a power-transmitting pulley $J^3$, the sleeve being supported in suitable bearings $A^3$, depending from the base A of the machine. These bearings are connected together by a web $A^4$, said web also supporting a bearing-box $A^5$ for an auxiliary shaft. From the foregoing it will be seen that the work is normally held within the circumference of the annular burner and there centered by the chuck F. The work at this time is rotated by the engagement of the clutch member $H^2$, carried upon the spindle H', with the driven member J', carried upon the sleeve J. When the severing operation is completed, the operator by pressure upon the lever I' drops the spindle H' and the work-table carried thereby, so that the article is removed from the burner, and simultaneously the clutch members are separated, so that the rotation of the glass is terminated. When another article has been placed upon the table, the pressure is relieved from the lever I', and the same at once returns the table to its elevated position and the upper portion of the article to be severed is centered within the burner.

Before the glass is acted upon by the burner it is deemed advisable to mark or scratch the same, so as to provide a true line for the severance of the parts. For this purpose an auxiliary shaft K is journaled within the bearing $A^5$ and is driven by means of a belt $J^4$, extending from the pulley $J^3$ to the pulley $J^5$, suitably secured upon the lower portion of the shaft K. This shaft K is provided with a grinding or marking disk K', of any suitable material—for instance, formed of carborundum. This disk is secured upon the shaft K by means of a suitable collar $K^2$, provided with a set-screw, by means of which it can be adjusted relatively to the article G to mark the same at any desired elevation. The disk K' may be circular in outline, and the glass may be rotated in the seat $K^3$ in relation to the disk, so as to produce a continuous marking around the circumference of the glass at the point of severance.

By my improved method the glass after having been marked with a line of severance is elevated by the means heretofore described into the annular field of flame or heat, which causes the severance of the parts in a quick and economical manner, so as to leave a comparatively smooth finished edge upon the glass, and thus requiring less grinding or finishing after the glass has been removed from the burner.

It is obvious that numerous changes may be made in the construction and arrangement of the several parts without departing from the spirit of this invention, as defined by the appended claims.

Having described my invention, what I claim is—

1. In a device of the class described, the combination of an annular burner provided with a continuous jet-orifice at its inner periphery, a rotating work-holder adapted to support and rotate an article within said burner, and a centering-chuck to retain said article concentric to the jet-orifice of the burner; substantially as specified.

2. In a device of the class described, the combination of an annular burner provided with a continuous jet-orifice at its inner periphery, and a rotating work-holder adapted to support and rotate an article within said burner; substantially as specified.

3. In a device of the class described, the combination of an annular burner provided with a jet-orifice upon its inner periphery, a rotating work-holder adapted to support and rotate an article within said burner, and means for vertically reciprocating said work-holder; substantially as specified.

4. In a device of the class described, the combination of an annular burner provided with a jet-orifice upon its inner periphery, a rotating work-holder adapted to support and rotate an article within said burner, means for vertically reciprocating said work-holder, and a centering-chuck adapted to engage the article above said burner; substantially as specified.

5. In a device of the class described, the combination of an annular burner provided with a jet-orifice upon its inner periphery, a rotating work-holder adapted to support and rotate an article within said burner, means for vertically reciprocating said work-holder, a centering-chuck adapted to engage the article above said burner, and a vertically-adjustable support for said chuck; substantially as specified.

6. In a device of the class described, the combination of an annular burner provided with a jet-orifice upon its inner periphery, a rotating work-holder adapted to support and rotate an article within said burner, means for vertically reciprocating said work-holder, a centering-chuck adapted to engage the article above said burner, a vertically-adjustable support for said chuck; and a vertically-adjustable support for said burner; substantially as specified.

7. In a device of the class described, the combination of an annular burner provided with a jet-orifice upon its inner periphery, a rotating work-holder adapted to support and rotate an article within said burner, means for vertically reciprocating said work-holder, a centering-chuck adapted to engage the article above said burner, a vertically-adjustable support for said chuck, a vertically-adjustable support for said burner, and means for automatically opening the jaws of said chuck; substantially as specified.

8. In a device of the class described, the combination of an annular burner provided with a jet-orifice upon its inner periphery, a rotating work-holder adapted to support and rotate an article within said burner, means for vertically reciprocating said work-holder, a centering-chuck adapted to engage the article above said burner, a vertically-adjustable support for said chuck, a vertically-adjustable support for said burner, means for automatically opening the jaws of said chuck, and means for limiting the opening movement of the jaws of said chuck; substantially as specified.

9. In a device of the class described, an annular burner formed of removable separable members spaced to provide a continuous jet-orifice extending around the inner periphery thereof; substantially as specified.

10. In a device of the class described, a base provided with a vertically-threaded standard, a burner-support adjustable thereon, an annular burner provided with a continuous jet-orifice at its inner periphery, a chuck-support vertically adjustable above said burner-support, and a rotatable chuck journaled in said chuck-support; substantially as specified.

11. In a device of the class described, a base provided with a vertically-threaded standard, a burner-support adjustable thereon, a chuck-support vertically adjustable above said burner-support, a rotatable chuck journaled in said chuck-support, an adjusting-nut beneath each of said supports, and a vertical guide engaging said supports; substantially as specified.

12. In a machine of the class described, a work-holder provided with a spindle, a clutch member carried by said spindle, and a driving-sleeve surrounding said spindle and carrying an engaging clutch member; substantially as specified.

13. In a machine of the class described, a work-holder provided with a spindle, a clutch member carried by said spindle, a guiding-sleeve surrounding said spindle and carrying an engaging clutch member; and a pivoted lever automatically held in an elevated position to engage said clutch members; substantially as specified.

14. In a device of the class described, a work-holder provided with a spindle, a clutch member located thereon, a rotatable sleeve provided with driving-pulleys, an opposite clutch member carried by said sleeve, a shaft driven from said pulleys, and a marking-disk carried by said shaft; substantially as specified.

15. In a device of the class described, the combination with a burner, a rotatable work-holder and its driving-shaft, of a base-plate provided with a seat, a shaft journaled in said plate adjacent to said seat and driven from the shaft of said work-holder, and a marking-disk carried by said shaft; substantially as specified.

16. In a device of the class described, the combination with a burner, a rotatable work-holder and its driving-shaft, of a base-plate provided with a seat, a shaft journaled in said plate adjacent to said seat and driven from the shaft of said work-holder, and an adjustable marking-disk carried by said shaft; substantially as specified.

17. In a device of the class described, a burner provided with a jet-orifice at its inner periphery, a work-holder beneath the same, and a rotatable chuck above the burner composed of a plurality of pivoted arms adapted to engage the article to be severed; substantially as specified.

18. In a device of the class described, a burner, a work-holder beneath the same, a rotatable chuck above the burner composed of a plurality of pivoted arms adapted to engage the article to be severed, a spring connecting the upper ends of said arms, and a nut to limit the inward movement of the same; substantially as specified.

19. In a device of the class described, a reciprocating work-holder provided with a spindle, a bearing at the lower end of said spindle, a pivoted lever, a link pivoted to said lever and seated in said bearing, and means for normally holding said lever and spindle in an elevated position; substantially as specified.

In testimony whereof I affix my signature in presence of two witnesses.

HENRY C. SCHRADER.

Witnesses:
J. W. FAUST, Jr.,
JNO. D. MCCALEB.